United States Patent
Cucala Garcia

(10) Patent No.: US 9,277,469 B2
(45) Date of Patent: Mar. 1, 2016

(54) METHOD FOR CELL RESELECTION AND CELL HANDOVER IN A WIRELESS COMMUNICATION SYSTEM

(75) Inventor: Luis Cucala Garcia, Madrid (ES)

(73) Assignee: Telefonica, S.A., Madrid (ES)

( * ) Notice: Subject to any disclaimer, the term of this patent is extended or adjusted under 35 U.S.C. 154(b) by 58 days.

(21) Appl. No.: 14/124,913

(22) PCT Filed: Jun. 4, 2012

(86) PCT No.: PCT/EP2012/060526
§ 371 (c)(1),
(2), (4) Date: Jan. 27, 2014

(87) PCT Pub. No.: WO2012/168201
PCT Pub. Date: Dec. 13, 2012

(65) Prior Publication Data
US 2014/0179321 A1    Jun. 26, 2014

(30) Foreign Application Priority Data

Jun. 10, 2011 (ES) .................................. 201130977

(51) Int. Cl.
*H04W 36/20* (2009.01)
*H04W 36/00* (2009.01)
*H04W 36/38* (2009.01)
(Continued)

(52) U.S. Cl.
CPC ...... *H04W 36/0094* (2013.01); *H04W 36/0061* (2013.01); *H04W 36/20* (2013.01); *H04W 36/385* (2013.01); *H04W 36/08* (2013.01); *H04W 48/20* (2013.01); *H04W 84/045* (2013.01)

(58) Field of Classification Search
None
See application file for complete search history.

(56) References Cited

U.S. PATENT DOCUMENTS

2009/0047960 A1* 2/2009 Gunnarsson et al. ......... 455/436
2009/0104905 A1* 4/2009 DiGirolamo et al. ......... 455/434
(Continued)

FOREIGN PATENT DOCUMENTS

WO   2009/043002 A2   4/2009
WO   2011/013178 A1   2/2011
WO   2011/027091 A1   3/2011

OTHER PUBLICATIONS

International Search Report for PCT/EP2012/060526, dated Sep. 13, 2012.

*Primary Examiner* — Ashish K Thomas
(74) *Attorney, Agent, or Firm* — Sughrue Mion, PLLC

(57) ABSTRACT

A method for cell reselection and cell handover in a wireless communication system.

The method comprises performing a cell reselection or handover between a user equipment connected to a radio access node and a neighbor cell, said neighbor cell having a subscriber list of subscribed user equipments.

Said user equipment is not in said subscriber list and the method further comprises:
   a. generating, said radio access node, a closed subscriber group (CSG) list containing said user equipment and at least one neighbor cell detected;
   b. communicating, said radio access node, said CSG list to a management entity;
   c. reporting, said management entity, to said at least one neighbor cell included in said CSG list an invited neighbor subscriber group list, or INSG list, containing said authorized user equipment; and
   d. performing said cell reselection or handover between said authorized user equipment and the neighbor cell if said authorized user equipment is included in said INSG list.

7 Claims, 3 Drawing Sheets

(51) Int. Cl.
  *H04W 36/08* (2009.01)
  *H04W 48/20* (2009.01)
  *H04W 84/04* (2009.01)

(56) References Cited

U.S. PATENT DOCUMENTS

| | | | |
|---|---|---|---|
| 2009/0191866 A1* | 7/2009 | Flore et al. | 455/434 |
| 2010/0069069 A1* | 3/2010 | Lee et al. | 455/435.2 |
| 2010/0120426 A1* | 5/2010 | Singh et al. | 455/435.1 |
| 2010/0124179 A1 | 5/2010 | Lee et al. | |
| 2010/0157943 A1* | 6/2010 | Horn | 370/331 |
| 2011/0105139 A1* | 5/2011 | On | 455/453 |
| 2011/0110311 A1* | 5/2011 | Krause et al. | 370/329 |
| 2011/0111728 A1* | 5/2011 | Ferguson et al. | 455/404.2 |
| 2012/0165065 A1* | 6/2012 | Sawada | H04W 36/0072 455/525 |
| 2012/0196641 A1* | 8/2012 | Suzuki | H04W 48/02 455/518 |
| 2013/0031358 A1* | 1/2013 | Holland et al. | 713/153 |

* cited by examiner

METHOD FOR CELL RESELECTION AND CELL HANDOVER IN A WIRELESS COMMUNICATION SYSTEM

CROSS REFERENCE TO RELATED APPLICATIONS

This application is a National Stage of International Application No. PCT/EP2012/060526, filed Jun. 4, 2012, claiming priority based on Spanish Patent Application No. P201130977, filed Jun. 10, 2011, the contents of all of which are incorporated herein by reference in their entirety.

FIELD OF THE ART

The present invention generally relates to a method for cell reselection and cell handover in a wireless communication system, comprising performing said cell reselection or handover between a user equipment connected to a radio access node and a neighbor cell as a function of at least signal emission power, said neighbor cell having a subscriber list of subscribed user equipments and more particularly to a method wherein said user equipment is not in said subscriber list and a new list including said user equipment is reported to said neighbor cell.

PRIOR STATE OF THE ART

The femtonode, or H(e)NB in 3GPP terminology, is a small base station that provides mobile broadband coverage in typically indoor scenarios. The femtonodes are connected to the telecom operator network by means of the customer's access network, typically an xDSL line or a fibre access.

The current femtonodes are of three types; the open access femtonode, that admits any mobile phone (also called User Equipment or UE) to connect to it, the Closed Subscriber Group (CSG) femtonode, that admits connections only from a list of selected UE's, and the hybrid femtonode, which gives preferred connection rights to a list of selected UE's, but admits any other UE to connect if there are radio resources available.

The latest releases of 3GPP include the possibility to handover connections between the femtonode layer and the macro cell layer, or between femtonodes. Regarding the frequency of operation, the femtonodes can operate in their own specific frequency band, or share the radio band with the macro cell layer.

They main problem of the femtonodes is the interference. The femtonodes can generate interference in two ways; interference with the macro cell layer, and interference between adjacent femtonodes.

In a typical femtonode deployment scenario, for example in multi-dwelling buildings, a femtonode installed in a house will be surrounded by some other femtonodes installed in the neighbor houses. In this case, every femtonode will provide service only to the UE's included in its CSG list if the femtonode is of the CSG type, or will admit other UE's in best effort way if it is of the hybrid type.

The problem of this type of deployment is that there will be areas in the boundary region between two neighbor femtonodes where the signal detected by a UE from its intended femtonode will be similar, or even lower, than the signal coming from the neighbor femtonode.

In this scenario, two outcomes could result:

On the one hand, if the neighbor interfering femtonode is of the CSG type, the UE will not be able to connect to that neighbor femtonode, and then the signal from the neighbor femtonode will be simple interference, thus reducing the available throughput to the UE from the intended femtonode. This situation will be shown in FIG. 1.

On the other hand, if the neighbor interfering femtonode is of the hybrid type, the UE will have the opportunity to connect to it, but it will be served by the neighbor femtonode as any other visiting UE connected to it and not included in its CSG. This situation will be shown in FIG. 2, where a UE included in the HeNB 2 CSG list is actually connected to the neighbor HeNB 3. This could mean that the UE will lose some type of special tariffs associated with its home femtonode, and/or that the UE will have access to the same best effort radio resources offered to any other visiting UE.

In both cases, the final result will be that some UE that request to connect to its intended femtonode, the femtonode whose CSG list the UE is included in, will receive a poor service in some areas of the home, specifically in those areas where the signal from neighbor femtonodes is comparable to the intended femtonode. The poor service could be a reduced downlink and uplink throughput, and/or the connection to a neighbor femtonode and losing any specific tariff associated with its intended femtonode.

Current 3GPP specifications cannot solve this situation, because the UE only stores a whitelist of CSG femtonodes where the UE can camp, and the HeNB's does not store a list of neighbor HeNB's or neighbor UE's, that could be used to decide when a UE is allowed to camp in a neighbor femtonode with similar rights that those associated with its intended femtonode. More specifically, 3GPP LTE specifications have avoided to store in the base stations, eNB's or HeNB's, the use of any neighbor base station list.

DESCRIPTION OF THE INVENTION

It is necessary to offer an alternative to the state of the art which covers the gaps found therein, particularly related to the lack of proposals which really solve the problem of those situations where a UE detects a signal coming from a neighbor femtonode, what creates an interference that can reduce downlink and uplink throughput, or the UE may connect to the neighbor femtonode so that it can lose any specific tariff associated to its intended femtonode.

To that end, the present invention provides a method for cell reselection and cell handover in a wireless communication system, comprising performing said cell reselection or handover between a user equipment connected to a radio access node and a neighbor cell as a function of at least signal emission power, said neighbor cell having a subscriber list of subscribed user equipments.

On contrary to the known proposals, in the method of the invention, in a characteristic manner said user equipment is not in said subscriber list and the method further comprises:

a) generating, said radio access node, a closed subscriber group list, or CSG list, containing at least said user equipment as an authorised user equipment and at least one neighbor cell detected by said radio access node and/or by said authorised user equipment;

b) communicating, said radio access node, said CSG list to a management entity;

c) reporting, said management entity, to said at least one neighbor cell included in said CSG list an invited neighbor subscriber group list, or INSG list, containing said authorised user equipment; and d) performing said cell reselection or handover between said authorised user equipment and said at least one neighbor cell if said authorised user equipment is included in said INSG list of said neighbor cell.

Other embodiments of the method of the first aspect of the invention are described according to appended claims 2 to 9, and in a subsequent section related to the detailed description of several embodiments.

BRIEF DESCRIPTION OF THE DRAWINGS

The previous and other advantages and features will be more fully understood from the following detailed description of embodiments, with reference to the attached drawings (some of which have already been described in the Prior State of the Art section), which must be considered in an illustrative and non-limiting manner, in which.

DETAILED DESCRIPTION OF SEVERAL EMBODIMENTS

Figure 1:
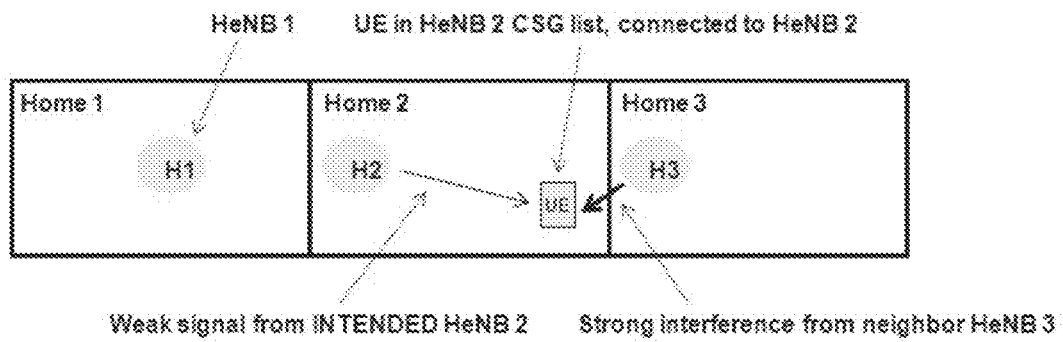
FIG. 1 shows the situation where a UE connected to its intended femtonode receives a strong interference from a neighbor femtonode.
Figure 2:
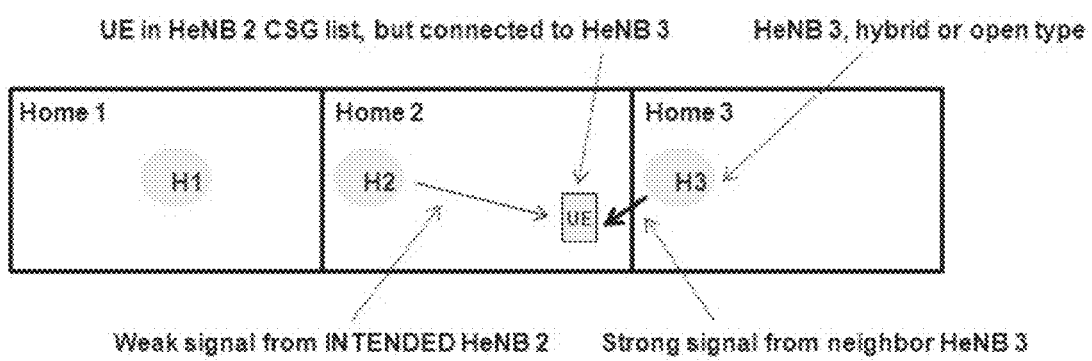
FIG. 2 shows a UE connected to a neighbor femtonode because of the weak signal received from its intended femtonode.

This invention proposes that when a UE is camping in its HeNB (INTENDED HeNB), a HeNB whose CSG list the UE is included in, it will scan other HeNB's whose signal levels are stronger than a given threshold. The UE will then generate and store a list with the detected HeNB's, called NEIGHBOR WHITE LIST. As a UE can store more than one HeNB's in its Whitelist, the list of CSG HeNB's it can connect to, there can be more than one Neighbor White List; in general, there will be a Neighbor White List associated with every HeNB in the Whitelist.

A CSG HeNB or a hybrid HeNB, as it is already specified by 3GPP, stores a list of authorized UE's that can connect to it, which is called Closed Subscriber Group (CSG). This invention adds to the CSG list a data field with the following information:

Neighbor HeNB's that are detected by the INTENDED HeNB, because when a HeNB can detect another HeNB, it can safely assume that the UE's in its CSG list will be able to detect the neighbor HeNB.

The Neighbor White Lists associated with the INTENDED HeNB, as they have been reported by the UE's to the INTENDED HeNB. In other words, the UE's will report to the INTENDED HeNB what other HeNB's they can detect when camping in the INTENDED HeNB.

In this way, the CSG list of the INTENDED HeNB includes not only a list of authorized UE's, but also a list of neighbor femtonodes. However, this list is not used for handover purposes, as the 3GPP LTE standard does not admit handovers based in neighbor base stations lists.

Once the INTENDED HeNB has generated the CSG list that includes the neighbor femtonodes, it communicates it to the Home Subscription Server (HSS). This server reads the neighbor HeNB's included in the CSG list, and reports to every one of those neighbor HeNB's a list of UE included in the INTENDED HeNB CSG list. In this way, every neighbor HeNB will construct a list of UE's that can connect to the INTENDED HeNB; this list will be called INVITED NEIGHBOR SUBSCRIBER GROUP (INSG), and will be stored in the neighbor femtonode along with its CSG list.

The HeNB's that admit an Invited Neighbor Subscriber Group list will form new categories of femtonodes:

Neighbor Friendly CSG (NF CSG) HeNB, which admits connections from UE's in the CSG list, and in the Invited Neighbor Subscriber Group list, in the latter case when there are radio resources available. A NF CSG HeNB will broadcast a NF CSG Indicator, whose presence and value of TRUE indicates the cell is a NF CSG cell.

Neighbor Friendly Hybrid (NF hybrid) HeNB, which gives preferred connection right to UE's in its CSG list, but admits UE's from its Invited Neighbor Subscriber Group with preferred access rights over any other UE trying to connect to it, in both cases if there are radio resources available. A NF hybrid HeNB will broadcast a NF CSG Indicator, whose presence and value of TRUE, and the absence of the CSG indicator in a HeNB which broadcasts a CSG identity, indicates the cell is a NF hybrid cell.

Once the UE has stored its Neighbor White Lists, and every HeNB has generated its Invited Neighbor Subscriber Group, it is possible to perform User Equipment procedures in idle mode (UE camping in a HeNB), and User Equipment RRC_CONNECTED state mobility (handover between femtonodes), following general rules of LTE for idle mode and connected state mobility, conveniently adapted by this invention.

Regarding idle mode procedures, when a UE is camping in an INTENDED HeNB (included in its Whitelist) but detects that the signal from a HeNB that is included in its Neighbor White List is good enough, it can proceed to perform cell reselection to that neighbor HeNB. As the UE will be included in the Invited Neighbor Subscriber Group of the neighbor HeNB, the HeNB will admit the UE to camp in it if the HeNB is of the NF CSG HeNB, hybrid HeNB or NF hybrid HeNB types.

Regarding the connected state mobility procedures, when a UE is connected to an INTENDED HeNB (included in its Whitelist) but detects that the signal from a HeNB that is included in its Neighbor White List is high enough, it will report the signal measured value to the INTENDED HeNB. The INTENDED HeNB can eventually start the handover procedure to the neighbor HeNB, which will accept it if the UE is in its Invited Neighbor Subscriber Group, if it is a NF CSG HeNB, or hybrid HeNB or a NF hybrid HeNB, and if there are radio resources available to the invited UE. If the handover procedure has been done to a NF CSG HeNB or to a NF hybrid HeNB, the telecom operator will have the opportunity to apply a specific tariff to that UE connection.

New Types of Femtonodes

The HeNB that admits a connection from UE's belonging to its neighbor CSG HeNB's will be called Neighbor Friendly. A Neighbor Friendly HeNB will store an Invited Neighbor Subscriber Group (INSG) list, which is a list of UE's included in its neighbor HeNB's CSG list. A Neighbor Friendly HeNB will broadcast a NF CSG Indicator, whose presence and value of TRUE indicates the cell is a NF CSG cell.

The possible types of femtonodes will then be:

Open access HeNB, which admits any UE

CSG HeNB, which admits connections only from UE's in the CSG list

Neighbour Friendly CSG (NF CSG) HeNB, which admits connections from UE's in the CSG list, and from UE's in the Invited Neighbor Subscriber Group list, in the latter case when there are radio resources available.

A NF CSG HeNB will broadcast a NF CSG Indicator, whose presence and value of TRUE indicates the cell is a NF CSG cell.

Hybrid HeNB, which gives preferred connection right to UE's in its CSG list, but admits any other UE to connect if there are radio resources available. The absence of the CSG indicator in a HeNB which broadcasts a CSG identity indicates the cell is a hybrid cell, as it is specified in 3GPP TS 25.367 [3].

Neighbour Friendly Hybrid (NF hybrid) HeNB, which gives preferred connection right to UE's in its CSG list, but admits UE's from its Invited Neighbor Subscriber Group, with preferred access rights over any other UE that is not either in the CSG list or the INSG list, if there are radio resources available.

A NF hybrid HeNB will broadcast a NF CSG Indicator, whose presence and value of TRUE, and the absence of the CSG indicator in a HeNB which broadcasts a CSG identity, indicates the cell is a NF hybrid cell.

Neighbour White List Generation in the UE

When a UE is camping in its HeNB (INTENDED HeNB), a HeNB whose CSG list the UE is included in [1], it will scan other HeNB's whose signal levels are stronger than a given threshold. The specific value of this threshold is set by the telecom operator and this patent application does not preclude any value.

The HeNB parameters that the UE will measure are the Reference Signal Received Power (RSRP) and for the Reference Signal Received Quality (RSRQ), as they are defined in 3GPP TS 36.214 [2].

The UE will then generate and store a list with the identities of the detected HeNB's over the given threshold, called NEIGHBOR WHITE LIST. The identity of every HeNB is broadcast in the PBCH as a CSG Identity parameter. For a neighbor HeNB to be included in the Neighbor White list, the neighbor HeNB must broadcast a NF CSG Indicator equal to TRUE, as it was previously described.

A Closed Subscriber Group (CSG) HeNB is identified by a unique numeric identifier called CSG Identity or CSG ID, A HeNB may optionally broadcast a CSG Indicator, whose presence and value of TRUE indicates the cell is a CSG cell. The absence of the CSG indicator in a cell which broadcasts a CSG identity indicates that it is a hybrid cell [3].

As a UE can store more than one HeNB's in its Whitelist, the list of CSG HeNB's it can connect to, there can be more than one Neighbor White List; in general, there will be a Neighbor White List associated with every HeNB in the Whitelist.

Improved CSG List in the HeNB

A CSG HeNB, or a hybrid HeNB, stores a list of authorized UE's that can connect to it, which is called Closed Subscriber Group (CSG). This invention adds to the CSG list some data fields with the following information:

Neighbor HeNB's that are detected by the INTENDED HeNB. When a HeNB can detect another HeNB, it can safely assume that the UE's in its CSG list will be able to detect the neighbor HeNB. For a neighbor HeNB to be included in the CSG list, the neighbor HeNB must broadcast a NF CSG Indicator equal to TRUE, as it was previously described.

Neighbor HeNB's that are detected by the UE's. The UE's will report to the INTENDED HeNB what other HeNB's they can detect when camping in the INTENDED HeNB, whose NF CSG Indicator is TRUE. The neighbor HeNB's are included in the Neighbor White Lists of every UE, and associated with the INTENDED HeNB. This procedure will help to overcome the hidden node problem, i.e. when a neighbor femtonode cannot be detected by the HeNB, but it can be detected by a UE when it is located in the boundary area between them.

The neighbor HeNB's that are detected by the UE will be reported to the HeNB following the general procedures described in 3GPP TS 36.331 [4], and in particular what it is specified for the case that the measurement of a neighbor cell is better than a given threshold [5].

Figure 3:
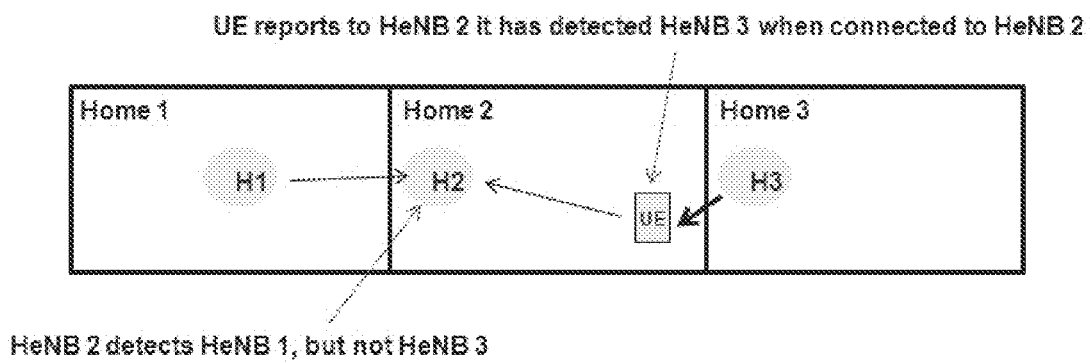
FIG. 3 shows the general scenario for the generation of the improved CSG list, according to an embodiment of the present invention.

The general scenario for the generation of the improved CSG list was shown in FIG. 3. In this way, the CSG list of the INTENDED HeNB includes not only a list of authorized UE's, but also a list of neighbor femtonodes. The improved CSG list will include a list of UE's (UE x, UE y ... ) and a list of neighbor HeNB's (CSG ID x, CSG ID y ... ).

However, this list is not used for handover purposes, as the 3GPP LTE standard does not admit a handover based in neighbor base stations lists. The improved CSG list will be used to generate an Invited Neighbor Subscriber Group list in every HeNB, as it will be described next. In this way, cell reselection and handover procedures will follow the general LTE 3GPP rules.

Invited Neighbour Subscriber Group List Generation in a HeNB

Once the INTENDED HeNB has generated the CSG list that includes the neighbor femtonodes, it communicates it to the Home Subscription Server (HSS), the LTE EPC node where the CSG Lists of the HeNB's are stored [6].

In this invention, the HSS reads the neighbor HeNB's included in the CSG list, and reports to every of those neighbor HeNB's the list of UE's included in the INTENDED HeNB CSG list.

Figure 4:
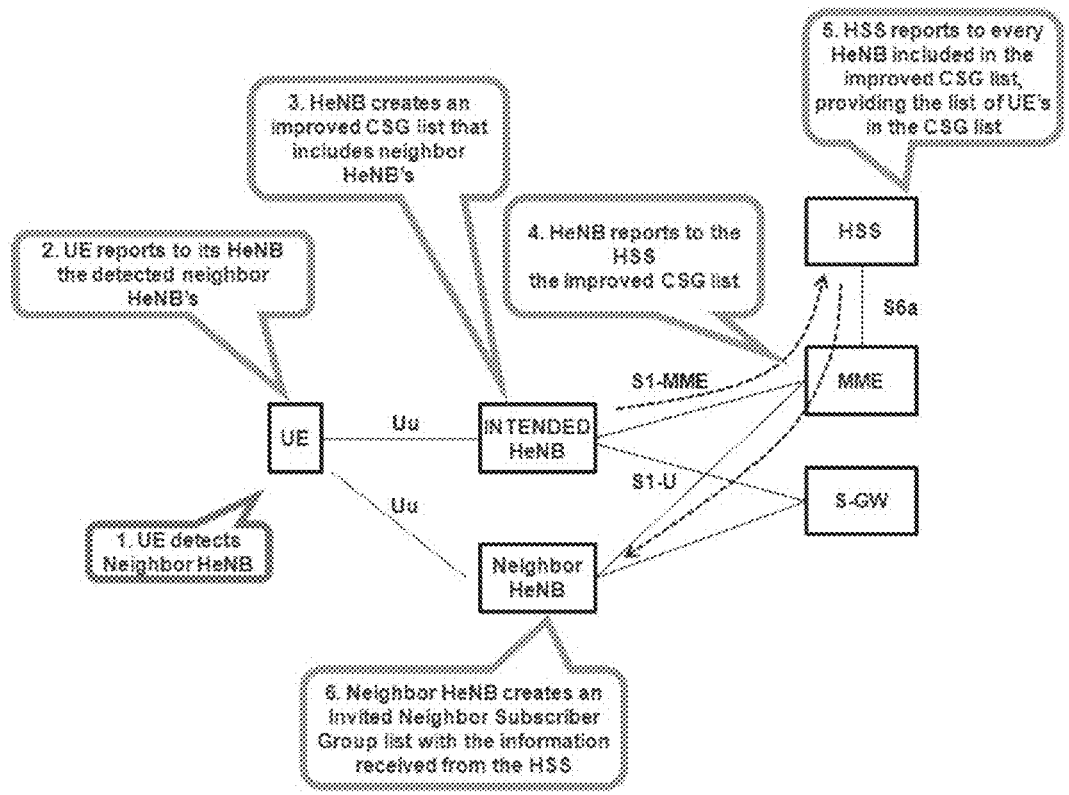
FIG. 4 shows the process of the generation of the Invited Neighbor Subscriber Group list, according to an embodiment of the present invention.
Figure 5:
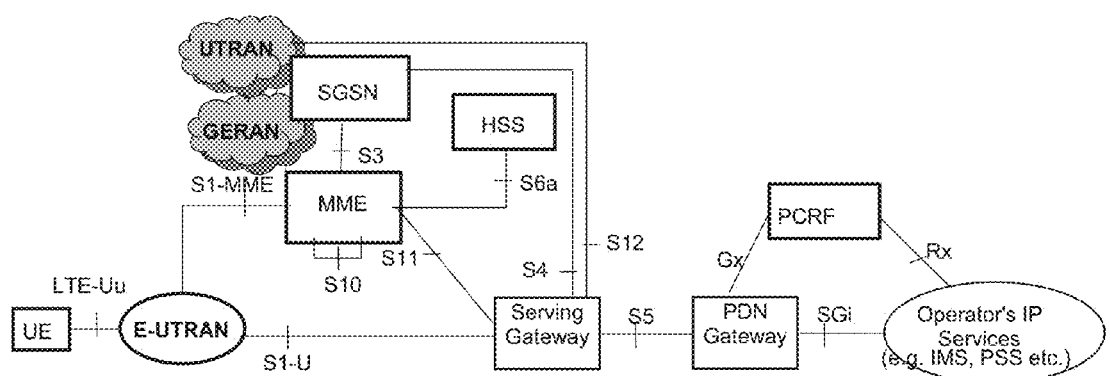
FIG. 5 shows the Policy and Charging Rules Function location in the general architecture of the Evolved Packet Core.

In this way, every HeNB will construct a list of neighbor UE's; this list will be called INVITED NEIGHBOR SUBSCRIBER GROUP (INSG), and it will be stored in the HeNB along with its CSG list. The process for the generation of this list was shown in FIG. 4. This figure is based in the general architecture model for Home eNodeB's, as it is described in 3GPP TR 23.830 [7].

Once the UE has stored its Neighbor White Lists, and every HeNB has generated its Invited Neighbor Subscriber Group list, it is possible to perform User Equipment procedures in idle mode (UE camping in a HeNB), and User Equipment RRC_CONNECTED state mobility procedures (handover between femtonodes), following the general rules of LTE for idle mode and connected state mobility, conveniently adapted by this invention.

Idle Mode Procedures

When a UE is camping in an INTENDED HeNB (included in its Whitelist) but detects that the signal from a HeNB that is included in its Neighbor White List is good enough, it can proceed to perform cell reselection to that neighbor HeNB. When the UE camps in a HeNB in its Neighbor White List, the NF HeNB will consider it an Invited UE.

The standard procedures for cell selection and reselection are described in 3GPP TS 36.304 [8]. This invention includes new reselection procedures to Neighbor Friendly CSG and Neighbor Friendly hybrid HeNB's.

Cell Reselection to a Neighbor Friendly CSG HeNB

In addition to normal cell reselection rules, the UE shall use an autonomous search function to detect NF CSG HeNB's whose CSG IDs are in the UE's Neighbor White List. The UE shall treat the detected CSG HeNB as a reselection candidate NF CSG HeNB if the CSG ID of the CSG HeNB is in the UE's Neighbor White List and the HeNB broadcasts a NF CSG Indicator equal to true, or as a barred HeNB otherwise.

If the UE is included in the Invited Neighbor Subscriber Group of the neighbor NF CSG HeNB, the HeNB will admit the UE to camp in it.

Cell Reselection to a Neighbor Friendly hybrid CSG HeNB

In addition to normal cell reselection rules, the UE shall use an autonomous search function to detect NF hybrid HeNB's whose CSG IDs are in the UE's Neighbor White List. The UE shall treat the detected hybrid HeNB as a reselection candidate NF hybrid HeNB if the CSG ID of the hybrid HeNB is in the UE's Neighbor White List and the HeNB broadcasts a NF CSG Indicator equal to true, or as a normal hybrid HeNB otherwise.

If the UE is included in the Invited Neighbor Subscriber Group of the neighbor NF hybrid HeNB, the HeNB will admit the UE to camp in it.

RRC_CONNECTED Procedures

Regarding the connected state mobility procedures, when a UE is connected to an INTENDED HeNB (included in its Whitelist) but detects that the signal from a HeNB that is included in its Neighbor White List is high enough, it will report the signal measured value to the INTENDED HeNB. The INTENDED HeNB can eventually start the handover procedure to the neighbor HeNB, following the general rules described in 3GPP TS 36.331 [9].

The NF CSG HeNB, or NF hybrid HeNB, will accept the handover if the UE is in its Invited Neighbor Subscriber Group, and if there are radio resources available for the invited UE. When the UE is connected to a HeNB in its Neighbor White List, the NF HeNB will consider it an Invited UE.

If the handover procedure has been done to a NF CSG HeNB or to a NF hybrid HeNB included in the UE Neighbor White List, and/or in the HeNB Invited Neighbor Subscriber Group, the telecom operator will have the opportunity to apply a specific tariff to that UE connection.

In general, the connection policies to be applied to the invited UE connection, regarding both radio resources assignment and tariffs, will be controlled by the Policy and Charging Rules Function (PCRF). The PCRF location in the general architecture of the EPC is described in 3GPP TS 23.401 [10].

The charging functions of the PCRF are described in 3GPP TS 23.203 [11]. This specification states that it shall be possible to apply different rates and charging models when a UE is consuming network services via a CSG cell or a hybrid cell according to the user CSG information. This invention makes it necessary to update this requirement, including the possibility to apply different rates when an invited UE is consuming network services via a NF CSG cell or a NF hybrid cell, according to the user Invited Neighbor Subscriber Group information.

The user profile is stored in the Subscription Profile Repository (SPR) of the PCRF, as it is specified in 3GPP TS 23.203 [12], which states that the SPR may provide user's subscription profile information, including user's CSG Information. This invention makes it necessary to update this requirement, including the possibility of providing user's NF CSG information. This information can be used for charging procedures, or for the QoS management of an Invited UE connected to a NF CSG HeNB or NF hybrid HeNB.

Advantages of the Invention

A UE included in the CSG of a HeNB will have the opportunity to connect to a neighbor CSG HeNB, if it is a Neighbor Friendly CSG HeNB, if the signal level of the Neighbor Friendly HeNB is comparable to the intended HeNB. The current 3GPP standard does not allow any UE camping or handover between CSG HeNB's.

If the neighbor femtonodes are of the hybrid HeNB type, with the current specification the neighbor's UE camping or handover requests will be treated as coming from any other UE, with no special priority. Thanks to this invention, the PCRF function has the opportunity of giving priority access to Invited UE's in the Invited Neighbor Subscriber of a NF hybrid HeNB Group over UE's not included in any list.

The PCRF function has the opportunity of optimizing the QoS of the UE when the signal level of the Neighbor Friendly HeNB is comparable to the intended HeNB, deciding if it is convenient to connect to the Neighbor Friendly HeNB. In these conditions, it is possible to improve the service provided to a UE located in the boundary area between two femtonodes, the intended HeNB and a neighbor HeNB, where the UE receives weak signal from its intended HeNB and a noticeable interference from the neighbor HeNB.

The PCRF function has the opportunity of applying special rates to an Invited UE connected to a Neighbor Friendly CSG HeNB or Neighbor Friendly hybrid HeNB.

A person skilled in the art could introduce changes and modifications in the embodiments described without departing from the scope of the invention as it is defined in the attached claims.

Acronyms

CSG Closed Subscriber Group
EPC Evolved Packet Core
HeNB Home eNodeB
HSS Home Subscription Server
INSG INVITED NEIGHBOR SUBSCRIBER GROUP
LTE Long Term Evolution
MME Mobility Management Entity
NF CSG Neighbor Friendly Closed Subscriber Group
PBCH Physical Broadcast Channel
PCRF Policy and Charging Rules Function
S-GW Serving Gateway
UE User Equipment
Uu UE radio interface to the HeNB References

[1] 3GPP TS 25.367 V9.5.0 "Mobility procedures for Home Node B (HNB); Overall description; Stage 2". Section 4 Overview.
[2] 3GPP TS 36.214 V9.0.0 "Evolved Universal Terrestrial Radio Access (E-UTRA); Physical layer Measurements. Section .1 UE measurement capabilities
[3] 3GPP TS 25.367 V9.5.0 "Mobility procedures for Home Node B (HNB); Overall description; Stage 2". Section 5 CSG Identification.
[4] TS 36.331 V10.0.0 "Radio Resource Control (RRC); Protocol specification". Section 5.5 Measurements
[5] TS 36.331 V10.0.0 "Radio Resource Control (RRC); Protocol specification". Section 5.5.4.5 Event A4 (Neighbour becomes better than threshold)
[6] 3GPP TR 23.830 V9.0.0 "Architecture aspects of Home NodeB and Home eNodeB". Section 4.2.2.1 Support for CSGs and Allowed CSG List handling
[7] 3GPP TR 23.830 V9.0.0 "Architecture aspects of Home NodeB and Home eNodeB". Section 4.3.2 Architecture model for Home eNodeB access network
[8] TS 36.304 V9.2.0 "User Equipment (UE) procedures in idle mode". Section 5.2 Cell selection and reselection

[9] TS 36.331 V10.0.0 "Radio Resource Control (RRC); Protocol specification". Section 5.3.1.3 Connected mode mobility

[10] 3GPP TS 23.401 V10.2.1 "General Packet Radio Service (GPRS) enhancements for Evolved Universal Terrestrial Radio Access Network (E-UTRAN) access". Section 4.2 Architecture reference model.

[11] 3GPP TS 23.203 V11.0.1 "Policy and charging control architecture (Release 11)". Section 4.2.2a Charging requirements.

[12] 3GPP TS 23.203 V11.0.1 "Policy and charging control architecture (Release 11)". Section 6.2.4 Subscription Profile Repository (SPR)

The invention claimed is:

1. A method for cell reselection and cell handover in a wireless communication system, comprising performing said cell reselection or handover between a user equipment connected to a radio access node and a neighbor cell as a function of at least signal emission power, said neighbor cell having a subscriber list of subscribed user equipments, said user equipment not being in said subscriber list, the method further comprising:
   a) generating, by said radio access node, an improved closed subscriber group (CSG) list containing at least said user equipment as an authorized user equipment and at least one neighbor cell detected by said authorized user equipment, said at least one neighbor cell being detected in response to the signal emission power of said neighbor cell being above a given threshold, and said improved CSG list comprising a plurality of neighbor cells and/or a plurality of user equipments connected to said radio access node;
   b) communicating, by said radio access node, said improved CSG list to a management entity;
   c) reporting, by said management entity to said at least one neighbor cell included in said improved CSG list, an invited neighbor subscriber group (INSG) list containing said authorized user equipment; and
   d) performing said cell reselection or handover between said authorized user equipment and said at least one neighbor cell in response to said authorized user equipment being included in said INSG list of said neighbor cell.

2. The method according to claim 1, further comprising generating, by said user equipment, at least one neighbor whitelist with at least one neighbor cell detected while connected to said radio access node.

3. The method according to claim 2, wherein said user equipment has a radio access node whitelist comprising radio access nodes that can be connected to by said user equipment, and has a plurality of said neighbor whitelists, each of said neighbor whitelists being associated with each radio access node of said radio access node whitelist.

4. The method according to claim 3, further comprising determining said signal emission power by measuring the Reference Signal Received Power and/or the Reference Signal Received Quality.

5. The method according to claim 1, further comprising each neighbor cell admitting connections from user equipments included in said subscriber list of said neighbor cell and from user equipments included in the INSG list received at c), and broadcasting a Neighbor Friendly CSG (NF CSG) indicator with a value of true.

6. The method according to claim 5, further comprising each neighbor cell further admitting connections from user equipments included neither in said subscriber list nor in said INSG list.

7. The method according to claim 1, wherein said management entity is a Home Subscriber Server.

* * * * *